(12) United States Patent
Chien et al.

(10) Patent No.: US 6,559,759 B2
(45) Date of Patent: May 6, 2003

(54) DUPLEX COMMUNICATION APPARATUS FOR MOTOR VEHICLE

(76) Inventors: Chih-Chung Chien, 9F, No. 29, Lane 468, Min An His Road, Hsin-Chuang, Taipei-Hsien (TW); Chen-Ming Yang, No. 13, Ma Lien Road, Wen Li Hsiang, Taipei-Hsien (TW)

( * ) Notice: Subject to any disclaimer, the term of this patent is extended or adjusted under 35 U.S.C. 154(b) by 134 days.

(21) Appl. No.: 09/862,596

(22) Filed: May 23, 2001

(65) Prior Publication Data

US 2002/0175809 A1 Nov. 28, 2002

(51) Int. Cl.[7] .................................................. B60Q 1/00
(52) U.S. Cl. ..................... 340/425.5; 340/426; 340/429; 340/438; 340/506; 307/9.1; 307/10.1; 307/10.2; 455/404
(58) Field of Search ............................... 340/425.5, 426, 340/428, 429, 438, 471, 506, 540, 541, 565; 307/9.1, 10.1, 10.2; 455/404

(56) References Cited

U.S. PATENT DOCUMENTS

| | | | | |
|---|---|---|---|---|
| 5,370,201 A | * | 12/1994 | Inubushi | 180/287 |
| 5,515,419 A | * | 5/1996 | Sheffer | 379/58 |
| 5,739,748 A | * | 4/1998 | Flick | 340/426 |
| 5,870,020 A | * | 2/1999 | Harrison, Jr. | 340/426 |
| 6,148,212 A | * | 11/2000 | Park et al. | 455/456 |
| 6,335,679 B1 | * | 1/2002 | Thomas et al. | 340/426 |
| 6,429,773 B1 | * | 8/2002 | Schuyler | 340/425.5 |

* cited by examiner

Primary Examiner—Toan Pham
(74) Attorney, Agent, or Firm—Rabin & Berdo, P.C.

(57) ABSTRACT

A duplex communication apparatus for motor vehicle comprises a sensor, a first cellular phone, an alarm, a RF module, a first decoder, a CPU, a memory, an input, an output, a voice generator, a DTMF decoder, and a speaker. First cellular phone and alarm are switched to a ready state when a motor vehicle owner leaves the motor vehicle so that once sensor or both sensor and alarm enabled the apparatus is activated, whereby a two-way communication is established between the owner and the person at the motor vehicle through sensor, CPU, voice generator, a second cellular phone carried by the owner, and speaker.

1 Claim, 4 Drawing Sheets

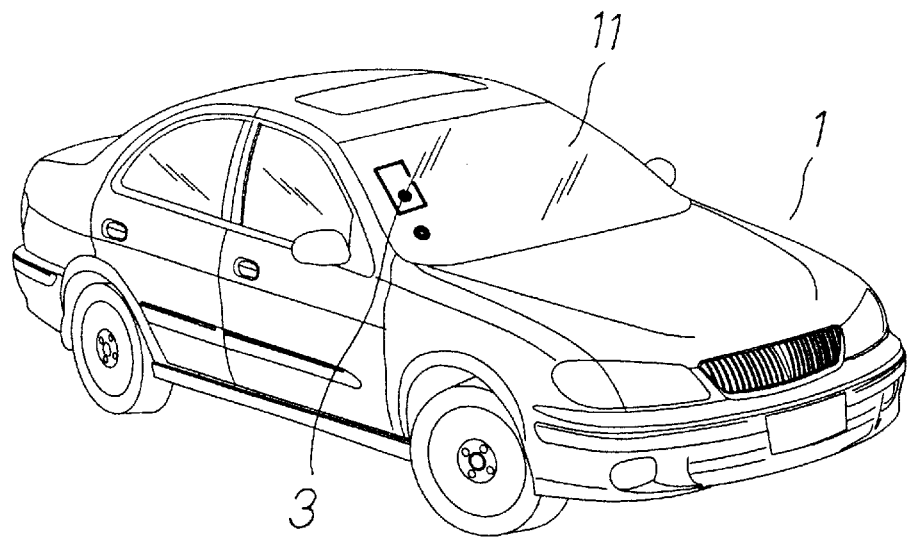
FIG. 1-A
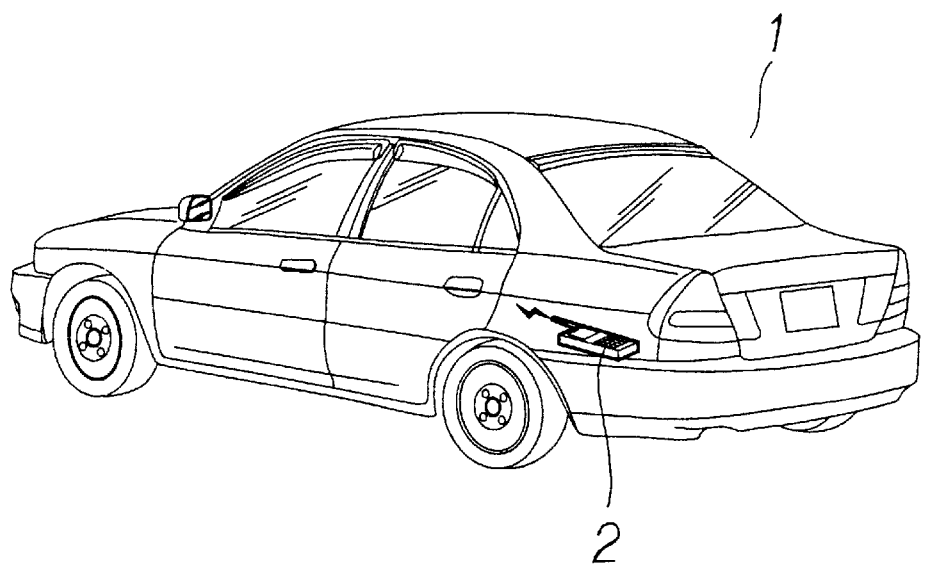
FIG. 1-B

DUPLEX COMMUNICATION APPARATUS FOR MOTOR VEHICLE

FIELD OF THE INVENTION

The present invention relates to communication devices and more particularly to a duplex communication apparatus for motor vehicle so as to enable motor vehicle owner to immediately know any thing happened to the motor vehicle which is parked either legally or not.

BACKGROUND OF THE INVENTION

Difficult to find a legal parking place in urban area in office hours during weekdays is many car owners' experience. Also, one of many unexpected things may happen to a parked car. For example, a theft may break into a parked car even the theft-proof alarm installed in car is activated. In another example, car may be towed away due to illegal parking. In still another example if car is parked in an obstructed place temporarily, even there is a contact number left on the parked car other person may still be unable to contact the owner because a cellular phone carried by the owner is turned off intentionally or the signal is too weak due to geographical limitation. Thus, it is desirable to provide a duplex communication apparatus for motor vehicle in order to overcome the above drawbacks of prior art.

SUMMARY OF THE INVENTION

It is therefore an object of the present invention to provide a duplex communication apparatus for a motor vehicle comprising a sensor mounted on a windshield being activated when a predetermined pressure is exerted thereon, a first cellular phone mounted in the motor vehicle being charged by a battery of the motor vehicle, an alarm coupled to the apparatus, a radio frequency (RF) module for receiving signals from or transmitting signals to an antenna of the motor vehicle, a first decoder, a central processing unit (CPU), a memory unit, an input unit for sensing signals sent from one of a plurality of motor vehicle components, an output unit activated in response to the signals received from the input unit, a voice generator, a dual-tone multi-frequency (DTMF) decoder, and a speaker wherein the first cellular phone and the alarm are switched to a ready state when a motor vehicle owner leaves the motor vehicle so that in a first case that the sensor is enabled by a person the apparatus is activated and the alarm is disabled simultaneously, whereby a two-way communication is established between the motor vehicle owner and the person through the sensor, the CPU, the voice generator, a second cellular phone carried by the motor vehicle owner, and the speaker; in a second case that both the sensor and the alarm are enabled because the motor vehicle is towed away by a tow truck the apparatus is activated, whereby a two-way communication is established between the motor vehicle owner and an law enforcement officer in charge of the tow truck through the sensor, the CPU, the voice generator, the second cellular phone carried by the motor vehicle owner, and the speaker; and in a third case that both the sensor and the alarm are enabled because the motor vehicle is broken into by a theft the apparatus is activate, whereby a two-way communication is established between the motor vehicle owner and the theft through the sensor, the CPU, the voice generator, the second cellular phone carried by the motor vehicle owner, and the speaker so as to be capable of disabling the motor vehicle in a remotely controlled manner.

The above and other objects, features and advantages of the present invention will become apparent from the following detailed description taken with the accompanying drawings.

BRIEF DESCRIPTION OF THE DRAWINGS

FIGS. 1A and 1B are perspective views showing a sensor and a cellular phone of a duplex communication apparatus according to the invention mounted on a windshield and under a rear seat of a car respectively;

DETAILED DESCRIPTION OF THE PREFERRED EMBODIMENTS

Figure 2:
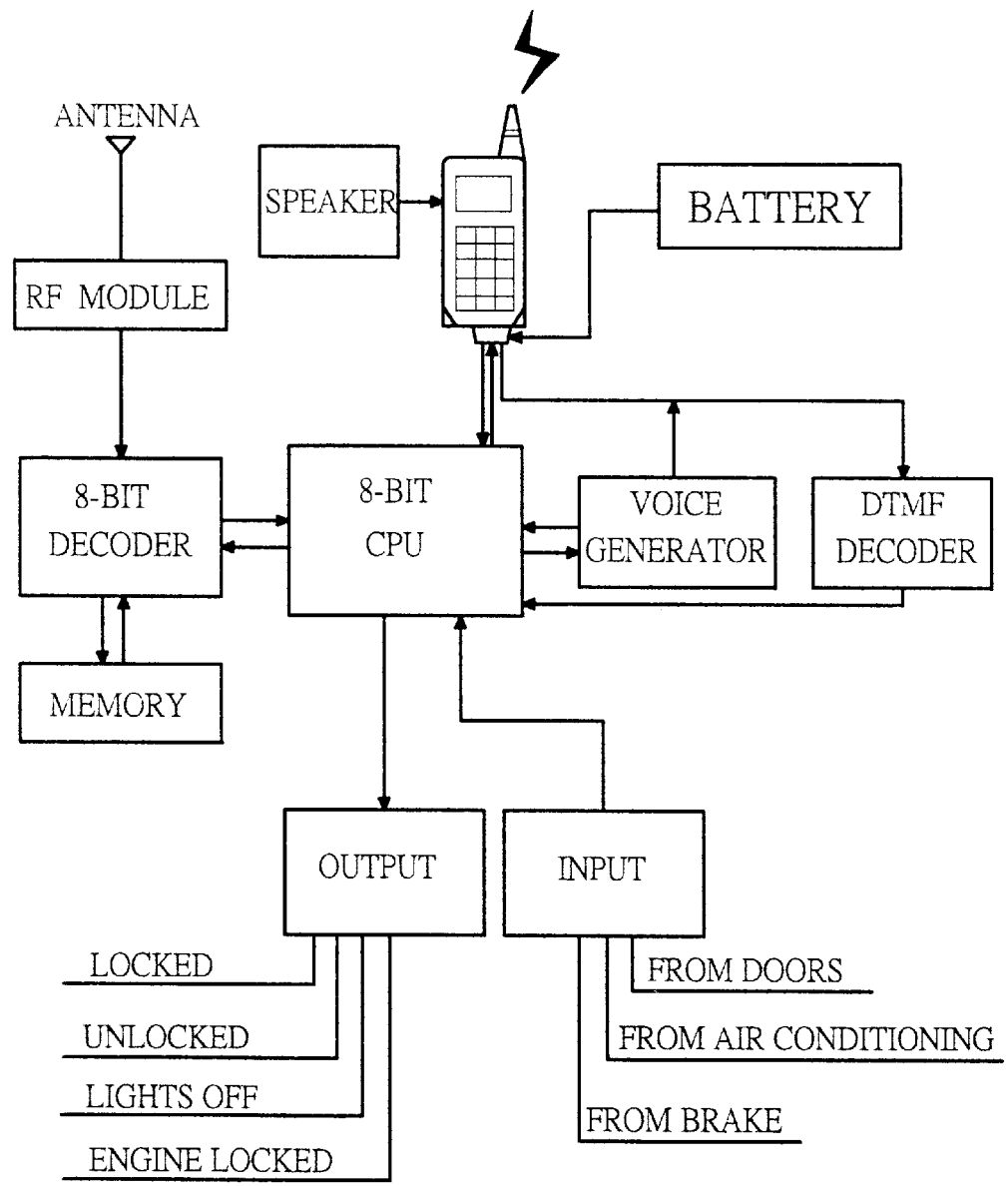
FIG. 2 schematically shows the interconnection of components of FIG. 1 duplex communication apparatus.

Referring to FIGS. 1A and 1B, there are shown a sensor 3 and a cellular phone 2 of a duplex communication apparatus according to the invention mounted on a windshield and under a rear seat (or in a trunk) of a car 1 respectively. Cellular phone 2 is coupled to a theft-proof alarm of car 1. Also, cellular phone 2 is charged by battery of car 1. Further, sensor 3 is activated when a predetermined pressure is exerted thereon. Referring to FIG. 2, in addition to sensor 3 and cellular phone 2 the constituent components of the duplex communication apparatus are a radio frequency (RF) module for receiving signals from or transmitting signals to antenna of car 1, a 8-bit decoder for decoding signals into data, a 8-bit master unit (e.g., central processing unit (CPU)), a memory unit for storing decoded data from 8-bit decoder, an input unit for sensing signals sent from doors, air conditioning, and brake, an output unit for locking engine, turning off lights, or unlocking in response to signals received from input unit, a voice generator, a dual-tone multi-frequency (DTMF) decoder for decoding signals from the cellular phone 2 into data to send to CPU, and a speaker.

Figure 3:
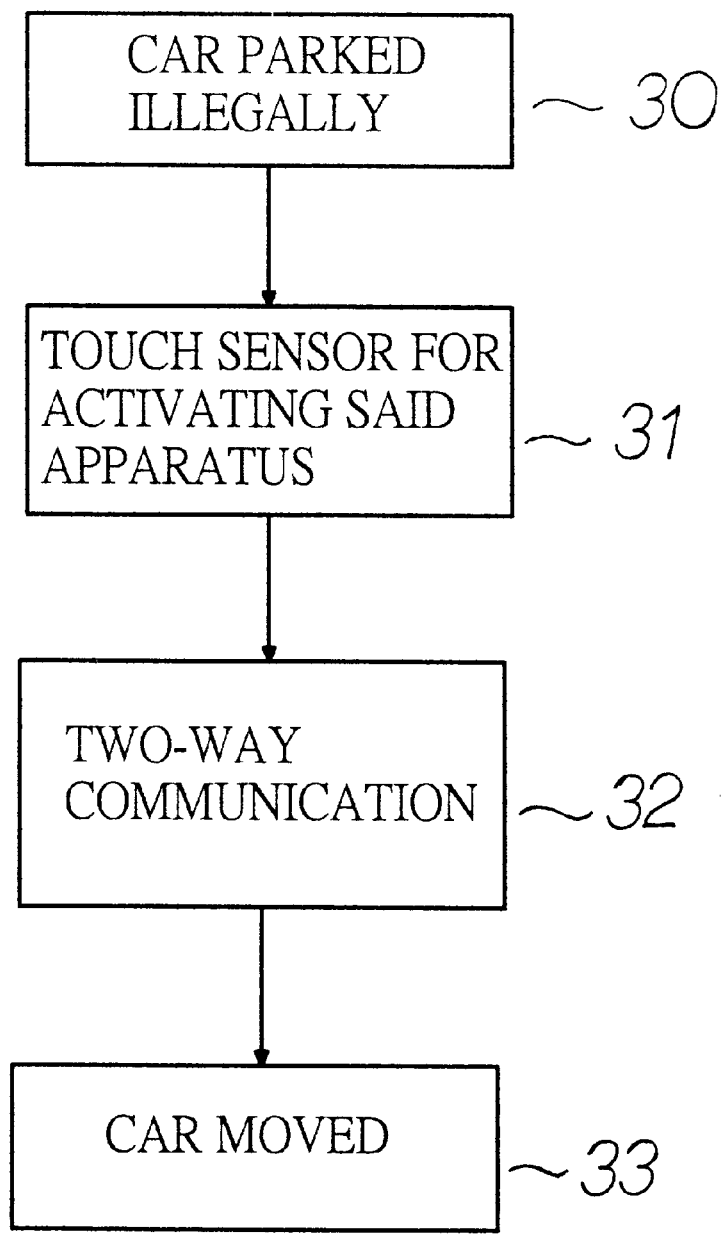
FIG. 3 is a flow chart illustrating one preferred embodiment of the invention.

Referring to FIG. 3, a flow chart illustrating one preferred embodiment of the invention is shown. For example, car 1 is parked in an obstructed place and car owner leaves the car 1 temporarily with the cellular phone 2 and the alarm in the car 1 switched to a ready state (step 30). The person being obstructed by the parked car 1 may touch sensor 3 for activating the apparatus and disabling the alarm simultaneously. In response, a signal is sent from sensor 3 to CPU of the apparatus for processing. CPU of the apparatus then sends a message, for example "Please Move The Car" from the voice generator to cellular phone 2 which in turn automatically dials the number of a cellular phone carried by the owner in response (step 31). Once car owner receives the call from cellular phone 2, the car owner may use the carried cellular phone to communicate with the calling party which speaks through the speaker of the apparatus (step 32). As an end, the car owner may move the parked car 1 immediately (step 33). This has the advantages of solving an illegal parked car quickly and peacefully and without activating the alarm of car.

Figure 4:
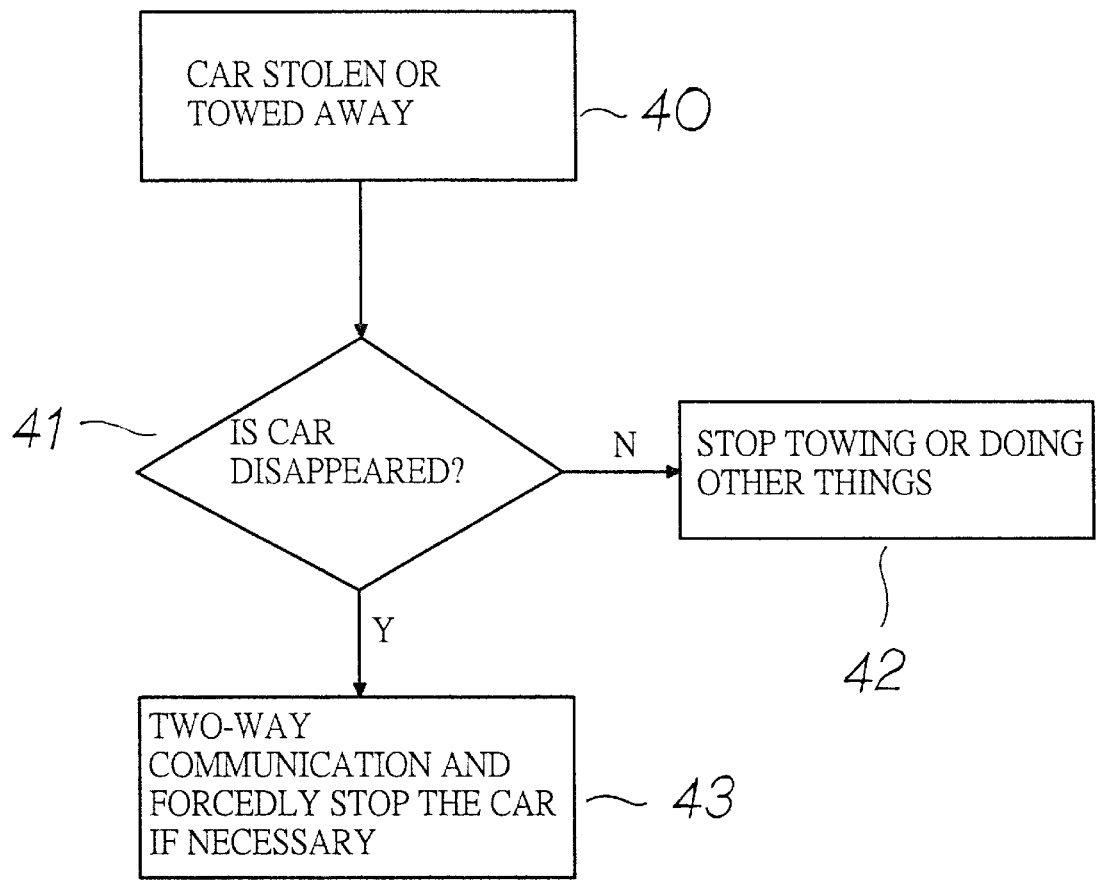
FIG. 4 is a flow chart illustrating another preferred embodiment of the invention.

Referring to FIG. 4, a flow chart illustrating another preferred embodiment of the invention is shown. For example, the car 1 is parked illegally so that it is towed away by a tow truck, or a theft has broken into the parked car 1. In either case, the alarm and the sensor 3 are activated (step 40). Thus informed car owner then rushes to the car 1 to see what happened (step 41). Car owner may ask the law enforcement officer to stop towing away the illegal parked car 1 in one case or think what should be done next if the theft has escaped due to the activation of alarm in the other case (step 42). However, if the car 1 disappeared car owner may similarly use the carried cellular phone to communicate with the law enforcement officer which speaks through the speaker of the apparatus so as to know where to take back the car 1 in one case, or warn the theft to stop the car 1 in a safe place immediately because the car owner may disable the engine in a remotely controlled manner within 15 seconds in the other case (step 43). Since the duration from the time the car owner finds his/her car 1 stolen to the time the car 1 stops automatically is short, the distance driven by the theft is short also. This may facilitate car owner to find the lost car 1. Alternatively, if someone or a law enforcement officer finds the lost car 1, he/she may touch sensor 3 for activating the apparatus and eventually inform the original car owner to take back the lost car 1.

While the invention has been described by means of specific embodiments, numerous modifications and variations could be made thereto by those skilled in the art without departing from the scope and spirit of the invention set forth in the claims.

What is claimed is:

1. A duplex communication apparatus for a motor vehicle comprising a sensor mounted on a windshield being activated when a predetermined pressure is exerted thereon, a first cellular phone mounted in said motor vehicle being charged by a battery of said motor vehicle, an alarm coupled to said apparatus, a radio frequency (RF) module for receiving signals from or transmitting signals to an antenna of said motor vehicle, a first decoder, a central processing unit (CPU), a memory unit, an input unit for sensing signals sent from one of a plurality of motor vehicle components, an output unit activated in response to said signals received from said input unit, a voice generator, a dual-tone multi-frequency (DTMF) decoder, and a speaker wherein said first cellular phone and said alarm are switched to a ready state when a motor vehicle owner leaves said motor vehicle so that in a first case that said sensor is enabled by a person said apparatus is activated and said alarm is disabled simultaneously, whereby a two-way communication is established between said motor vehicle owner and said person through said sensor, said CPU, said voice generator, a second cellular phone carried by said motor vehicle owner, and said speaker; in a second case that both said sensor and said alarm are enabled because said motor vehicle is towed away by a tow truck said apparatus is activated, whereby a two-way communication is established between said motor vehicle owner and an law enforcement officer in charge of said tow truck through said sensor, said CPU, said voice generator, said second cellular phone carried by said motor vehicle owner, and said speaker; and in a third case that both said sensor and said alarm are enabled because said motor vehicle is broken into by a theft said apparatus is activated, whereby a two-way communication is established between said motor vehicle owner and said theft through said sensor, said CPU, said voice generator, said second cellular phone carried by said motor vehicle owner, and said speaker so as to be capable of disabling said motor vehicle in a remotely controlled manner.

* * * * *